United States Patent
Valdespee et al.

(10) Patent No.: US 10,064,383 B1
(45) Date of Patent: Sep. 4, 2018

(54) LITTER LIFT

(71) Applicants: Michele L. Valdespee, Jersey City, NJ (US); Mark Shaffer Annett, Livingston, NJ (US); Thomas E. Hazinski, Clifton, NJ (US)

(72) Inventors: Michele L. Valdespee, Jersey City, NJ (US); Mark Shaffer Annett, Livingston, NJ (US); Thomas E. Hazinski, Clifton, NJ (US)

(73) Assignee: Michele L. Valdespee, Jersey City, NJ (US)

(*) Notice: Subject to any disclaimer, the term of this patent is extended or adjusted under 35 U.S.C. 154(b) by 0 days.

(21) Appl. No.: 15/867,762

(22) Filed: Jan. 11, 2018

(51) Int. Cl.
*A01K 1/01* (2006.01)
*F16M 11/38* (2006.01)
*F16M 11/42* (2006.01)

(52) U.S. Cl.
CPC ........... *A01K 1/0107* (2013.01); *F16M 11/38* (2013.01); *F16M 11/42* (2013.01)

(58) Field of Classification Search
CPC ..... A01K 1/0107; B66F 7/0666; B66F 7/065; F16M 11/38; F16M 11/42
USPC ............... 119/753, 843, 844, 161, 165, 174; 187/211; 182/69.1, 69.2, 69.3
See application file for complete search history.

(56) References Cited

U.S. PATENT DOCUMENTS

| | | | | |
|---|---|---|---|---|
| 3,208,432 A * | 9/1965 | Fisk | A01K 13/00 119/756 |
| 4,558,847 A * | 12/1985 | Coates | A61D 3/00 254/122 |
| 4,611,823 A * | 9/1986 | Haas | F16M 11/42 108/119 |
| 4,967,672 A * | 11/1990 | Leather | A47B 3/02 108/120 |
| 5,183,009 A * | 2/1993 | Vito | A01K 1/0107 119/165 |
| 5,740,884 A * | 4/1998 | DiMucci | A61G 1/02 182/141 |
| 5,927,745 A * | 7/1999 | Cunningham | A47B 31/04 108/118 |
| 7,044,086 B2 * | 5/2006 | Fisher | A01K 13/00 119/473 |
| 7,228,818 B2 * | 6/2007 | Lynch | A01K 1/0107 119/168 |
| 8,104,725 B1 * | 1/2012 | Kebre | A01K 1/0107 248/164 |
| 9,163,777 B1 * | 10/2015 | Knecht | F16M 11/24 |
| 2003/0033672 A1 * | 2/2003 | Jehn | A61G 1/0567 5/611 |
| 2009/0126643 A1 * | 5/2009 | Fountain | A01K 1/0107 119/165 |
| 2011/0240409 A1 * | 10/2011 | Bacon | B66F 7/065 187/269 |
| 2016/0312944 A1 * | 10/2016 | McCoy | F16M 11/38 |
| 2016/0375919 A1 * | 12/2016 | Wright | B62B 3/02 119/165 |

* cited by examiner

*Primary Examiner* — Lisa L Tsang

(57) ABSTRACT

A litter lift that eliminates the need to bend over to clean out kitty litter by bringing the kitty litter up to a height that it can be easily changed. The litter lift is configured as a scissor lift and has two upper crossbars upon which a litter pan removably nests.

14 Claims, 10 Drawing Sheets

LITTER LIFT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

The present application relates to aids for the elderly and disable disabled particularly for those that have trouble bending.

BACKGROUND

In the U.S. around 40M (35%) of households own at least one cat with an average cat owning household having 2.1 cats. As result, the estimated U.S. cat population has 74 to 86 million (household pets).

Of these domestic cats, a surprisingly large percentage are owned by single females, according to a recent study by Nielsen Scarborough. They found there are large percentage of single women living with cats in certain cities. According to the data Portland, Oreg., is the top city for cat ownership with 9.9% of single females in the area own at least one cat. Seattle, Wash., comes in a close second with 9.3% but Pittsburgh, Pa. comes in third with 8.7%.

So not only are single woman more likely to be cat owner but, as the married woman with cats age, these woman are more likely to outlive their spouse and become a single woman living alone with one or more cats.

According to the Institute on Aging, of the older adults who were living outside nursing homes or hospitals in 2010, nearly one third (11.3 million) lived alone. Older women are twice as likely, as older men to live alone (37 percent and 19 percent, respectively). In 2010, 72 percent of older men lived with a spouse, only 42 percent of older women did.

Arthritis is the most common cause of disability, in the U.S., with nearly half of all adults age 65 are diagnosed by their doctor with some form of arthritis. If you are living alone, it can be a debilitating condition and it can severely limit your ability to not only care for yourself but also for a pet. Unfortunately, not only are woman more likely to be living alone with one ore more cats but statistically women also have significantly higher risk for nearly all types of arthritis, except gout. This is particularly true for osteoarthritis of the knees. As a result, simple tasks like bending over to clean out a litter box can become extremely painful, and at times impossible.

Therefore, there continues to be a need for a better way to clean out a litter box that does not require bending over.

SUMMARY

In order to overcome the deficiencies in the prior art, systems and methods are described herein.

One aspect of the claimed invention involves a litter lift comprising at least two sets of interconnected outer and inner crossing members connected to one another by at least four crossbars configured as a scissor lift, associated with the two lower crossbars is a set of wheels and at least one linear actuator, wherein the linear actuator is configured to pull the two lower crossbars towards one another in order to elevate the scissor lift elevates; and a litter pan configured to removably nest on the two upper crossbars, the litter pan has a base, a litter area, and two ends extending downward from the base; the litter area is configured to hold cat litter and has two regions: an upper portion above the base and a lower portion below the base where the lower portion will always be within the scissor lift when the litter pan is nested and the two ends are configured to constrain the movement of the litter pan such that it will not slide off of the two upper crossbars once seated on them.

A further aspect comprises adding a battery connector connected either internally or externally to one of the upper crossbars, externally to an outer crossing member, or internally to an inner crossing members.

These and other aspects described herein present in the claims result in features and/or can provide advantages over current technology.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

DETAILED DESCRIPTION

The instant devices and approach provide a way to elevate a litter box so that it can be cleaned out without requiring the pet owner to bend over but when collapsed is still close enough to the ground that it does not alter a cat's toileting behavior. Several exemplary systems will now be described beginning with FIG. 1A-D.

FIG. 1A-D shows, in simplified form, a litter lift 10 in various stages of its operation.

Figure 1A:
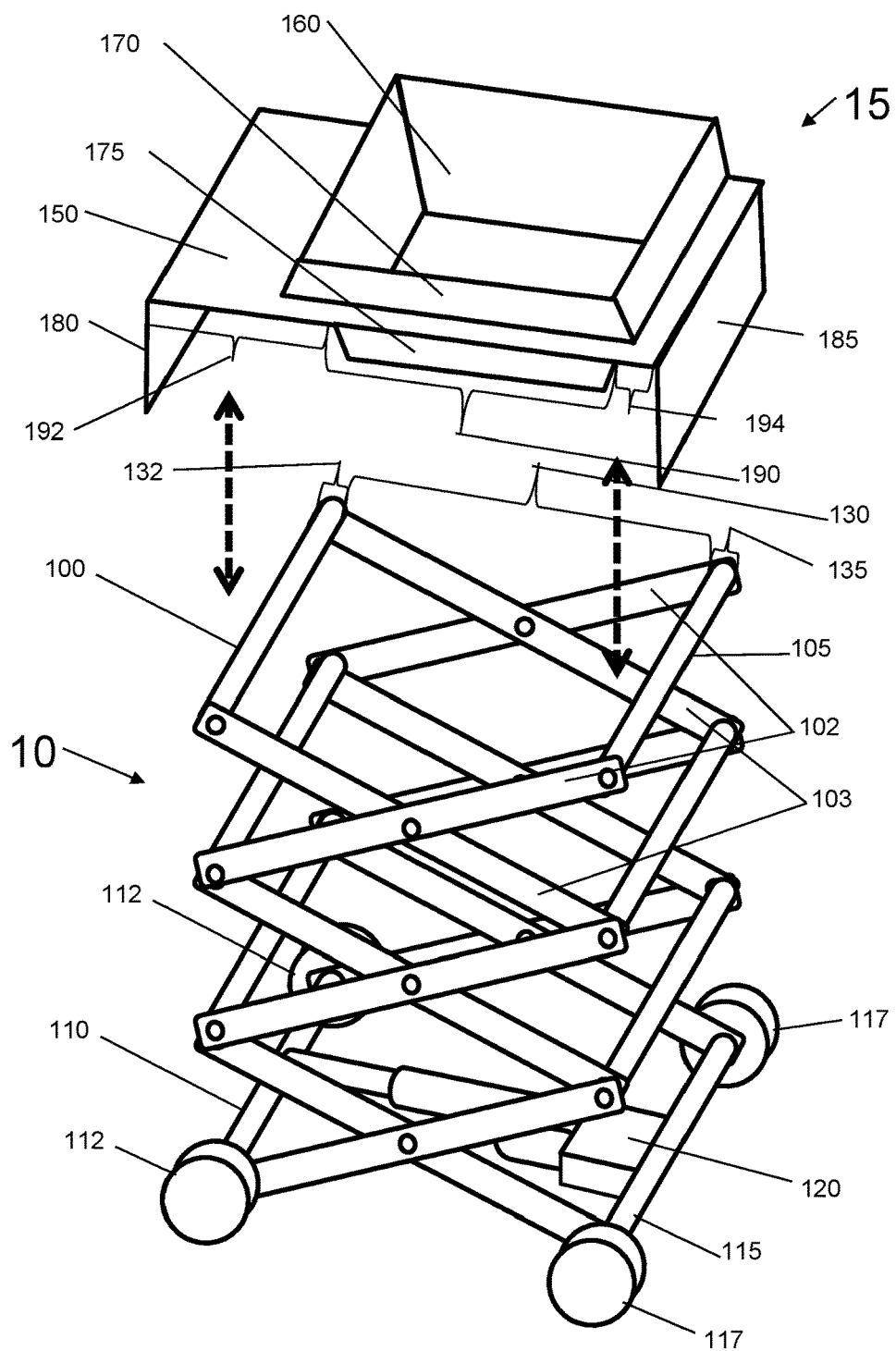
FIG. 1A-D shows, in simplified form, a litter lift in various stages of its operation.

In FIG. 1A we see the litter lift 10, configured as a scissor lift, in its elevated position, with the litter pan 15 raised above the litter lift 10.

Figure 1B:
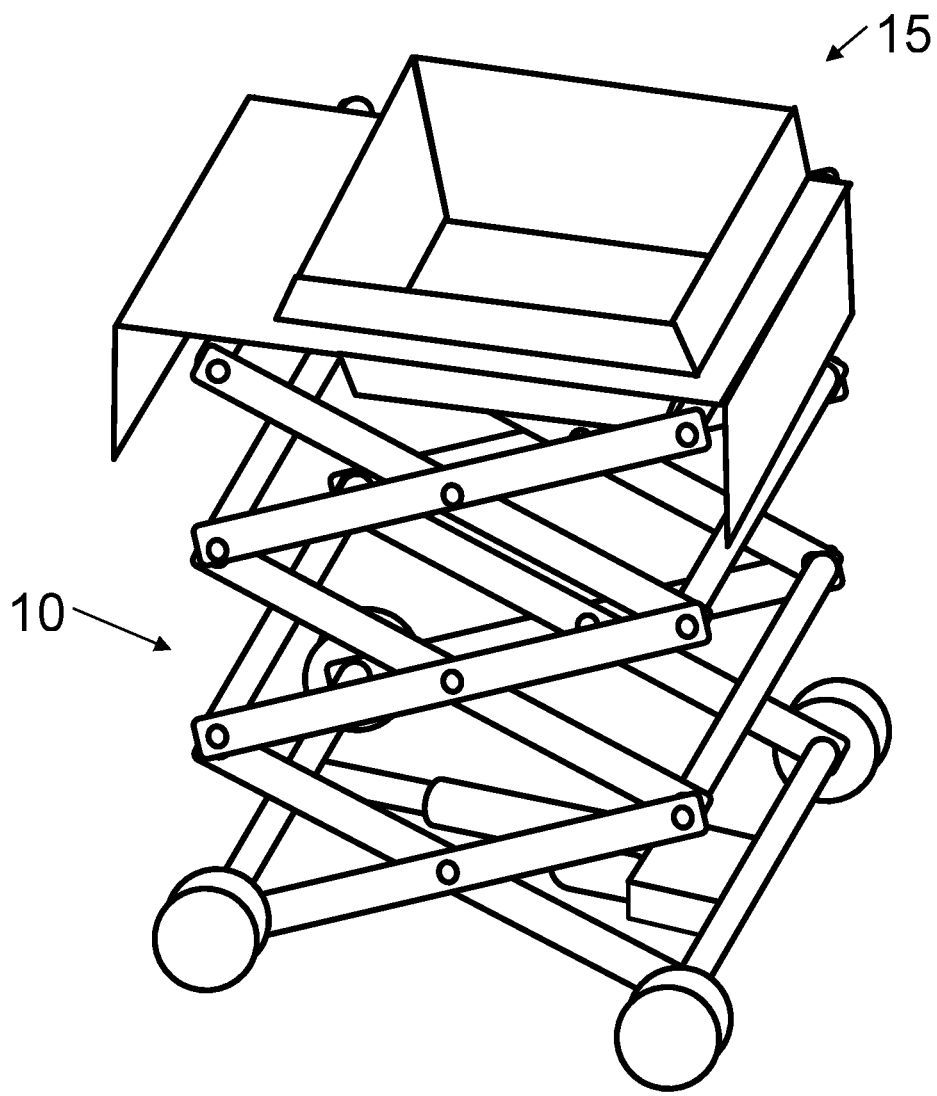

In FIG. 1B the litter pan 15 is seated on the litter lift 10 in the fully elevated position.

Figure 1C:
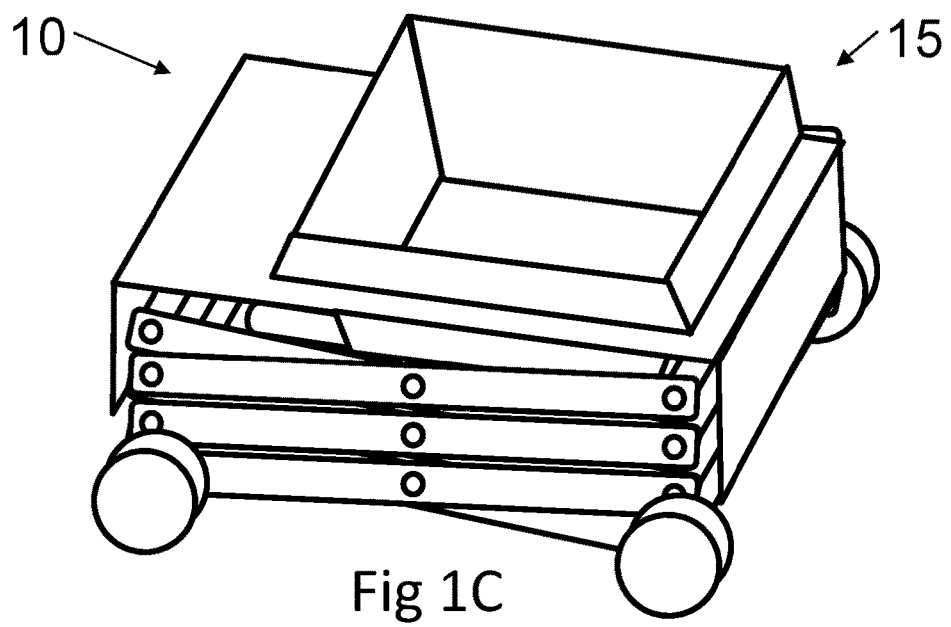

In FIG. 1C the litter pan 15 is still seated on the litter lift 10, which is now in the fully collapsed position.

Figure 1D:
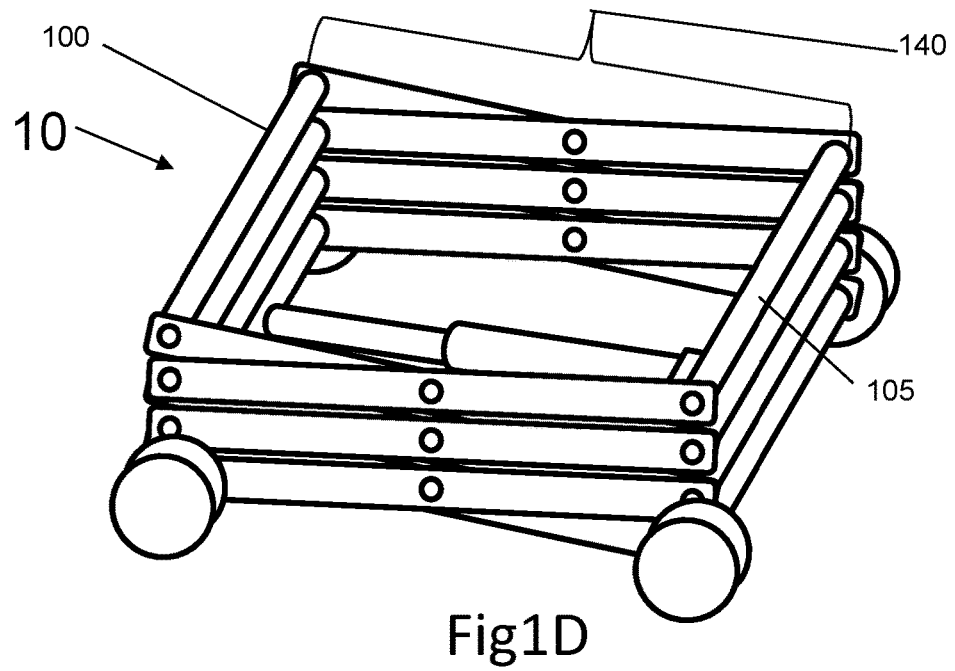

FIG. 1D the litter pan 15 has been removed while the litter lift 10 is in the fully collapsed position.

[Note: while a litter box pan that is fixed to a lift is also anticipated, the ability to easily remove the litter pan 15 for cleaning is such a highly desirable feature that the embodiment with a removable litter pan 15 feature will be the focus of the current discussion.]

Returning to FIG. 1A, the litter lift 10 is shown as scissor lift (comprising two sets of interconnected outer 102 and inner 103 crossing members with the two sets connected to one another by crossbars) and has two upper crossbars 100, 105 and two lower crossbars 110,115. Associated with the lower crossbar 110 on the left of the drawing is a set of wheels 112 and associated with to the lower crossbar 115 on the right of the drawing is another set of wheels 117. Spanning between the lower crossbars 110,115 is at least one linear actuator 120.

The wheels 112,117 associated with the lower crossbars 110, 115 may be the same or different on each side of the lift. For instance, one or more of the wheels may be swiveling caster. However, if swiveling casters are used then depending how the linear actuator 120 is attached between the lower crossbars 110,115 additional alignment mechanisms (not shown) may be required to insure smooth actuation.

Because of the lack of mechanical advantage, due to the fact that the linear actuator 120, as shown, is connected directly between the two lower crossbars 110,115, the system as shown requires a significant amount of force to initiate lifting. Specifically, we have have found that, with the simple configuration illustrated, a linear actuator capable of generating a pull force of 300 pounds or more has enough strength to create a relatively smooth motion and to pull the lower crossbars 110,115 together when in the fully collapse position (see FIG. 1C-D).

What is important to know is in the fully collapsed position, keeping the lower crossbars parallel becomes very important for smooth operation. Given the significant force required to raise the lift, what happens naturally is that mechanical play within the lift will cause the litter lift 10 to actually rise up in a slightly jerky motion. What occurs is that one side of lift (the side visible from the front or the back in the drawings) will begin to move up until it has used up all of the mechanical play on it's side and then the other side will begin to move up, creating a jerky motion if there is significant play in the system (or it is otherwise out of balance).

Returning to the discussion of swivel casters, if swivel casters are used for one or more sets of wheels 112,117 and the wheels do not start out aligned and there is significant play within the system then the lack of alignment can cause significant torque on the system and may result in damage the lift.

As such, care must be taken to insure that the two lower crossbars 110,115, remain as parallel as possible to produce a smooth operation.

One way to insure that the two lower crossbars 110,115, remain parallel (or fixed at angle that is substantially parallel) is to mechanically attach the linear actuator 120 to the two lower crossbars 110,115, such as by welding them together, so there is no mechanical play at all between them.

However, in practice, one typically wants to be able to easily replace a component such as linear actuator and it would typically be attached by for example by bolting it on. If the manner of attachment does not fully constrain the interconnection between the linear actuator 120 to the two lower crossbars 110,115, then care must be taken to eliminate mechanical play, especially rotational play that would allow the two lower crossbars 110,115, to move away from being parallel to one another. In such a situation, secondary or additional alignment mechanisms (not shown) such as linear glides (e.g. a bar sliding into a close fitting shaft) may be desirable to insure smoothness of the lifting motion. Other options include, using two or more linear actuators that are slaved together, which is especially desirable if the actuators are placed external to the lift, rather than internal to the litter lift 10 as shown in FIG. 1A-D.

[Note is common practice to increase the mechanical advantage of a scissor lift by going by spanning between crossbars of different levels, with best mechanical advantage achieved when the linear actuator 120 would span between one of the lower crossbars 110,115 and one of the upper crossbars 100,105. However, as will be described shortly, such a placement of an internal linear actuator 120 would limit the litter box pan's 15 ability to be seated as close to the ground as possible. Additionally, springs and other elastic/compressive members (not shown) can be used reduce the mechanical requirements of the linear actuator.]

Returning to FIG. 1, the litter pan 15 is configured to removably nest between the two upper crossbars 100, 105. The litter pan 15 has a base 150 that is configured to slide on the upper crossbar 100 on the right side of the drawing (but could just as easily have slid on the right side or on both sides).

Within the litter pan 15 is an area for kitty litter 160 that is configured to be consistent with the depth of a typical kitty litter box, which is typically between 4-6" deep.

The litter area 160 is configured to hold cat litter and has two regions: an upper portion 170 that is configured to be above the base 150 and a lower portion 175 that is configured to be below the base 150, such that the lower portion 175 will always be within the scissor portion of the litter lift 10 when seated on it. This is desirable such that when the litter lift 10 is fully collapsed (see FIG. 1C) the litter pan is configured to sit just above the linear actuator 120 (see FIG. 1A), or as close to the ground as possible. Ideally the lower portion is maximized such that there is no upper portion and only a lower portion, although the opposite is also anticipated.

When the litter lift 10 is fully elevated the two upper crossbars 100, 105 are at their closest upper crossbar distance 130 (as measured to the inside of the crossbars), with the crossbar on the left side of the drawing having a width/diameter 132 (effective width) and the crossbar on the right side also having a width/diameter 135 (effective width).

Turning to FIG. 1D, we see that when the litter lift 10 is fully compressed the two upper crossbars 100, 105 are at their furthest upper crossbar distance 140 as measured to the outside of the crossbars.

As a result of the variability in the distance between of the two upper crossbars 100, 105, the litter pan 15 must accommodate both extremes. As such, some important relationships will now be discussed.

Returning to FIG. 1A, when the litter lift 15 is fully extended then the lower portion 170 of the litter area 160, having a lower portion length 190, must be less or equal to the closest upper crossbar distance 130 and should be configured such that easily slides between the two upper crossbars 100, 105 when the litter lift 10 is fully extended.

The litter pan 15 also has two ends; a sliding end 180 and a constraining end 185, which both extend downward from the base 150. The two end are configured to constrain the movement of the litter pan 15 such that it will not slide off of the two upper crossbars 100, 115, once seated on them.

There is a sliding distance 192 that is the distance between the sliding end 180 and the lower portion 175 of the litter area 160 and similarly there is a constraining distance 194 that is the distance between the constraining wall 185 and the lower portion 175 of the litter area 160. The combined length of the sliding distance 192, the lower portion length 190 and constraining length 194 must be greater than or equal the furthest upper crossbar distance 140.

The constraining distance 194 must be greater than or equal to at least one of the widths/diameters 132, 125 of the two upper crossbars 100, 105 and, ideally both, so that it can go over either upper crossbar 100, 105 and can go on in either direction.

The sliding distance 192 must be greater than or equal to the furthest upper crossbar distance 140 difference minus both the lower portion length 190 and constraining length 194. [Note: by extending the sliding distance 192 to simply be greater than or equal to the furthest upper crossbar distance 140 difference minus both the lower portion length 190 then it is possible to eliminate the sliding end 180 and still have the litter pan 15 not be not slide off of the two upper crossbars 100, 115, once seated on them. However, two ends are desirable because it makes the litter pan easier to put on.]

Having described the basic operation, we will now focus our attention on some enhancements. The linear actuator 120, can either be battery or line powered and ideally it is actuated by a remote control switch, such that no bending is required to activate the linear actuator 120. (Note: additionally, limit switches may be desirable to control the height.)

To further reduce the need for bending careful consideration of battery placement (or the interconnection for line power in the event that one wants to be able to roll the lift around without being attached to a cord) must be done. Two such placements will now be discussed.

Figure 2A:
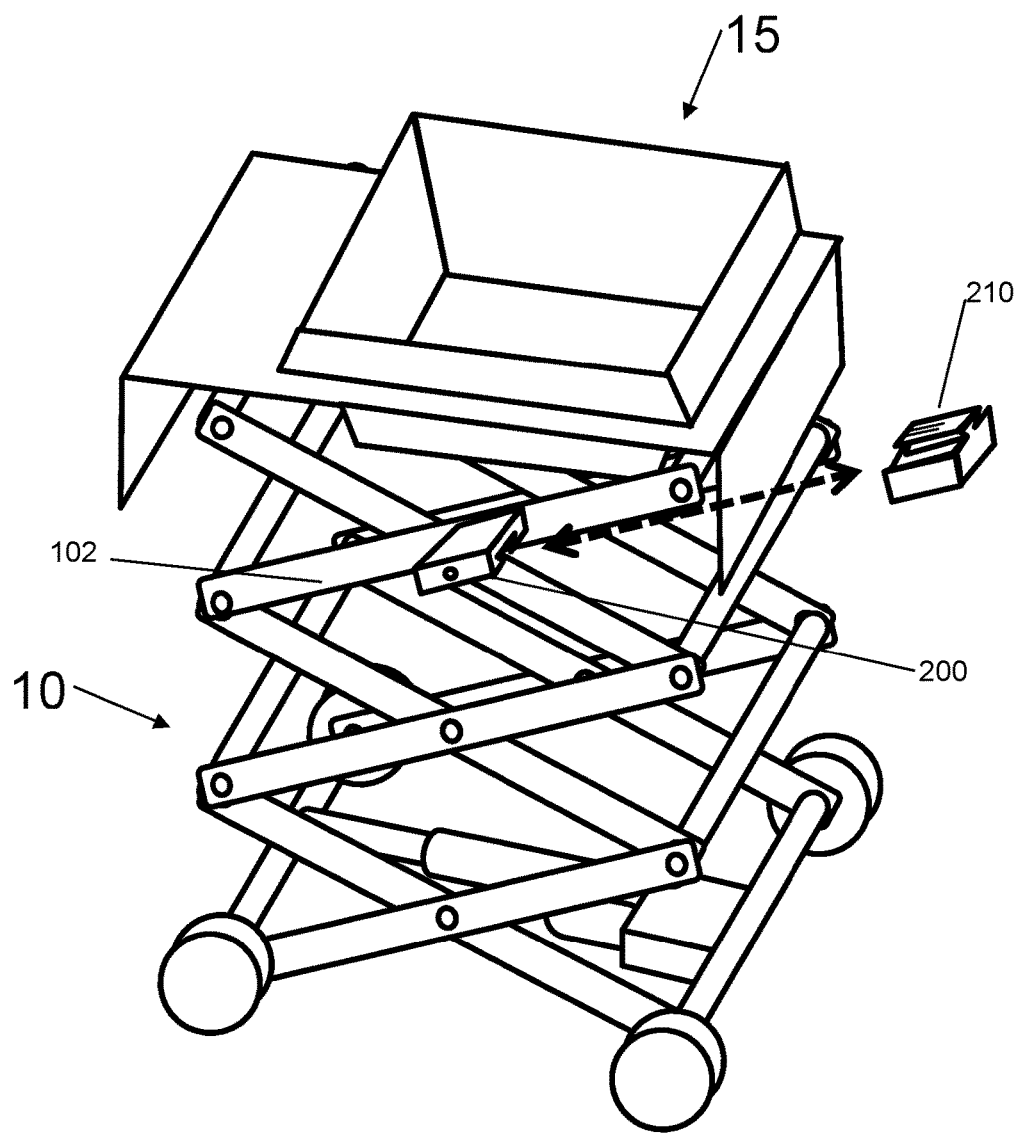
FIG. 2A-C shows, in simplified form, a litter lift, with an external battery connector and removable battery.
Figure 2B:
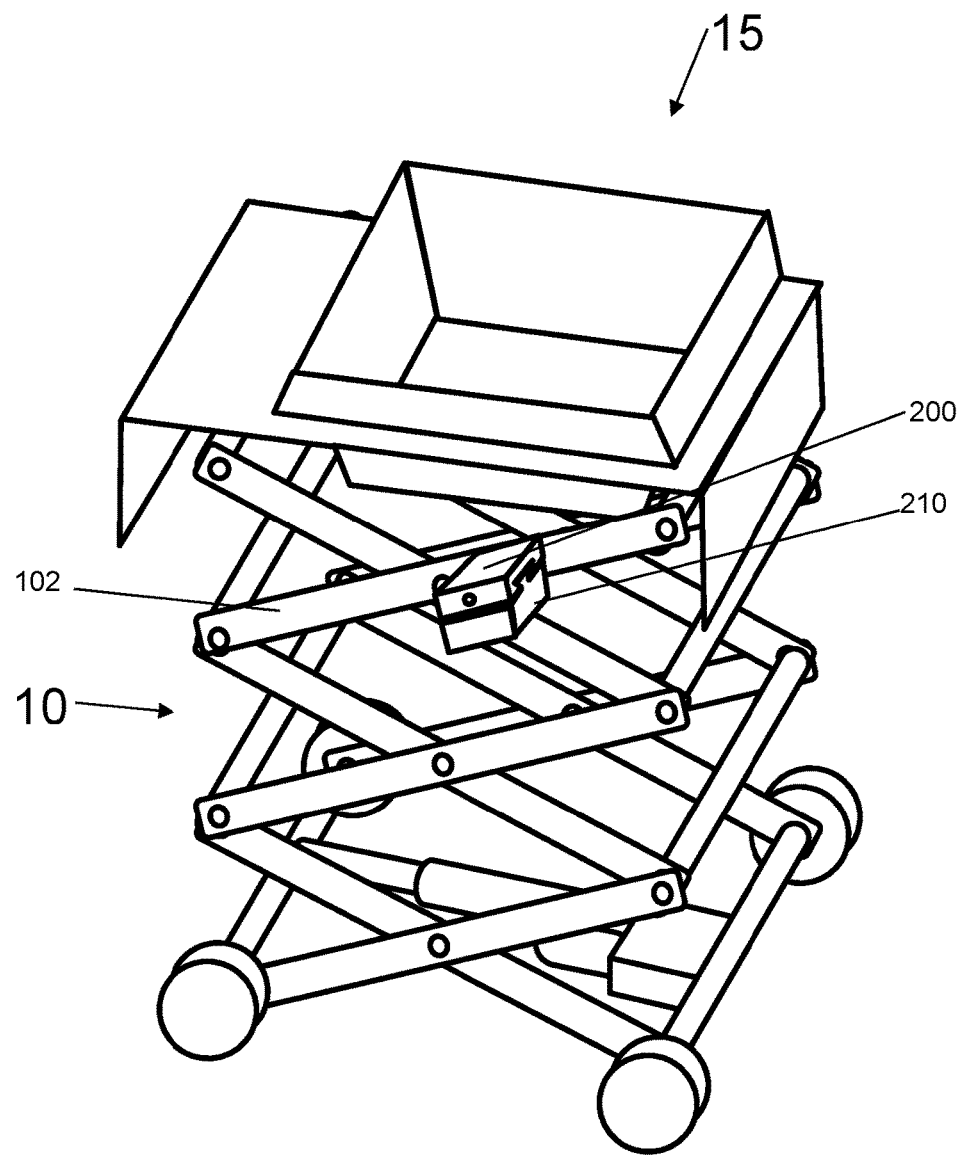
Figure 2C:
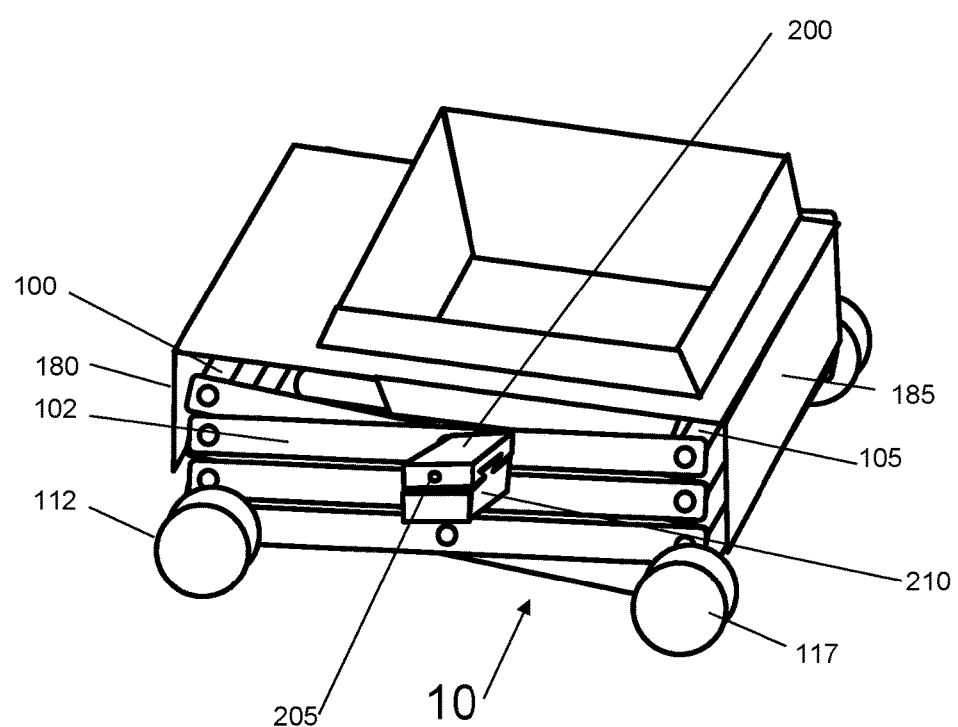

FIG. 2A-C shows, in simplified form, a litter lift 10, with an external battery connector 200 and removable battery 210.

In order to reduce the need for bending, the battery connecter 200 is shown as external to the litter lift 10 and attached to one of the top most attached outer crossing members 102. As such, the battery 210 is easily accessible for removal (see FIG. 2A) and insertion (see FIG. 2B) into the battery connector 200 in the elevated position, even with litter pan 15 still in place.

In FIG. 2C we see, the litter lift 10 in the collapsed position. Care should be taken with respect to placement of the battery connector 200, along the outer crossing members 102, such that neither the battery connector 200 nor the battery 210 interferes with the wheels 112, 117 in the collapsed position. Additionally, it is important that the battery not run out in the collapsed position, as such a low battery indicator 205 is represented, which could provide a visual and/or audible alert. Other options for charging the battery include a docking station (useful for line power) or remote charging.

As previously mentioned, one of the advantages of the battery connector 200 placement in FIG. 2A-C is that the battery can be accessed even with litter pan 15 still in place. However, the external placement, along the outer crossing members 102, is disadvantageous, particularly if the battery is heavy, because it may cause the lift to be unbalance and to lean towards the battery 210, especially if there is excessive play in the system. As such, a counter weight on the other side of the lift is often desirable to keep the lift balanced. Other options for external placement, include attaching the battery connector to either one of the upper crossbars 100,105 and removing (or extending to cover) a portion the associated sliding end 180 or constraining end 185 to accommodate the alternative placement of the battery connector 200 and battery 210.

Up to this point, external placement of the battery connector and battery has been discussed. Options with the battery placed internally will now be discussed.

Just as it was important to insure that the battery did not interfere with the wheels when collapsing when the battery is mounted externally, it becomes equally, if not more important, to insure that an internally mounted battery connector/battery combination does not interfere with the motion of the lift during normal operation. This is particularly true when the battery connector/battery combination is mounted internally to one of the upper crossbars (see FIG. 3A-B) or mounted internally to one of the inner crossing members (see FIG. 4A-B), because during collapsing the battery connector/battery combination will have a tendency to interfere with one or more of the cross members and during elevation with the litter pan. Some exemplary ways of insuring that the battery connector/battery combination does not interfere will now be presented.

Figure 3A:
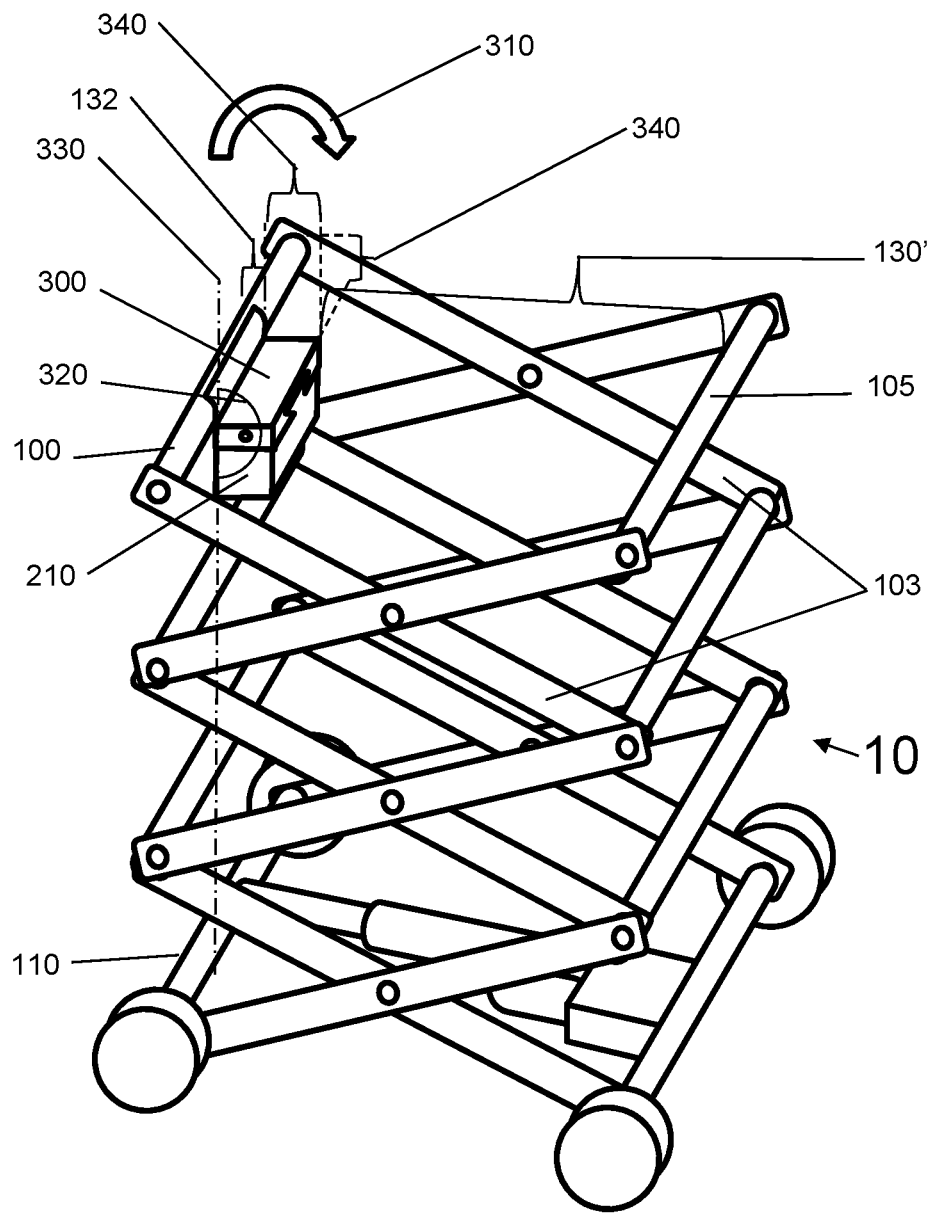
FIG. 3A-B shows, in simplified form, a litter lift, with an internal battery connector and removable battery.
Figure 3B:
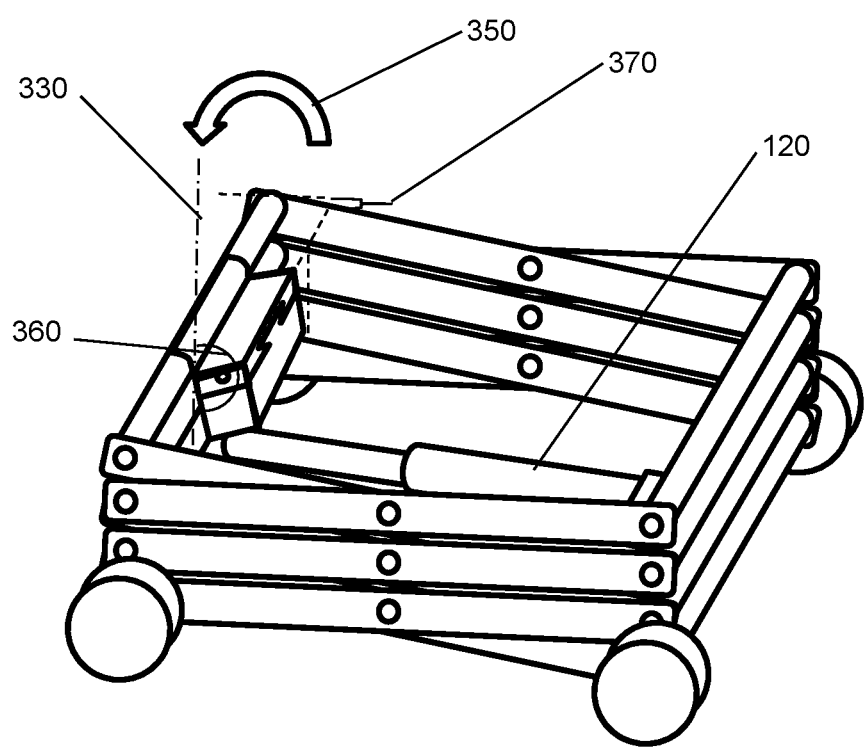

FIG. 3A-B shows, in simplified form, a litter lift 10, with an internal battery connector 300 and removable battery 210. The battery connector in this case is connected to the upper crossbar 100 on the left side of the drawing (but could just as easily have been connected to the upper crossbar 105 on the right side).

In this example, we will discuss the case where the upper crossbar 100 is configured to be fixedly secured to at least one of the crossing members, which in this example is an inner crossing members 103, and the battery connector 300 is fixedly secured to the upper cross bar 100 such that the rotation of the battery connector 300 can be planned for. The importance of planning being to insure that the system in configured such that the battery does not interfere with the crossbars during opening and closing. [Note: versions where a battery connector and battery are allowed to rotate and are weight balance such that there position can be planned for are also anticipated.]

In this configuration, when the litter lift 10 is fully extended the battery connector 300 will have rotated inwardly 310 to its maximum angle 320, related to a theoretical line 330 running from the upper crossbar 100 to the lower crossbar 110 (or whatever crossbar protrudes inwardly the most). One technique to insure smooth operation, which will now be discussed in detail, is to configure the system such that the battery 210 (and the connector 200) never exceeds being parallel to the theoretical line 330. Specifically, the battery connector 300 (with the battery 210) is mounted to the upper crossbar 100 and configured such that the maximum angle 320 is typically 180 degrees or less, with respect to the theoretical line 330. The maximum angle 320 produces an offset distance 340 between the top of the battery connector 300 (or battery 210 if it protrudes above the connector), which needs to always greater than zero, otherwise the litter pan 15 (not shown in FIG. 3A-B) will slide on the battery connector 300, rather than the upper crossbar 100.

The need for an offset distance 340 is typically not an issue when the litter lift 10 is fully extend; however, when the litter lift is fully collapsed the battery connector 300 rotates in an outward direction 350 and produces a minimum angle 320 related to a theoretical line 330 running from the upper crossbar 100 to the lower crossbar 110. The minimum angle 360 is obviously always less than the maxim angle. However, what is import is that the battery the offset distance be such that when the battery connector 300 has rotated to its minimum angle that the collapsed offset distance 370, between the top of the battery connector 300 (or battery 210 if it protrudes above the connector) is also always greater than or equal to zero. Otherwise, the litter pan 15 will sit on the battery connector 300, rather than the upper crossbar 100 when the litter lift is fully compressed.

[Note: the type of rotation just discussed similarly needs to be taken into account if the battery connector is mounted on one of the upper crossbars external to the lift (as previously mentioned). The important aspect being, in this situation, is that you typically want to make sure that the battery connector is not allowed to rotate to angle between the theoretical line 330 running from the upper crossbar 100 to the lower crossbar 110 of greater than 180 degrees (or that would otherwise produces a condition that would cause either the battery connector or the battery to protrude between the crossbars.]

Returning to FIG. 3A-B, the fact that the battery connector 300 is now mounted internally produces a couple of changes in the previously discussed relationships: the width/diameter of the upper crossbar (used in the equations) has grown and is now the combined width/diameter of the crossbar 132 and the maximum distance protruded 350 by either the battery connector 300 or the battery 210 towards to the upper crossbar 105 on the opposite side; and, consequently, the closest upper crossbar distance 130' (used in the equations) has shrunk and is now the minimum distance between whichever of the battery connector 300 or the battery 210 to the upper crossbar 105 on the opposite side.

Additionally, it is understood that when the litter lift 10 is in the fully collapsed position that there needs to be clearance between the battery 210 (or the battery connector 300 if it protrudes lower than the battery) and the linear actuator (and/or the floor).

Figure 4A:
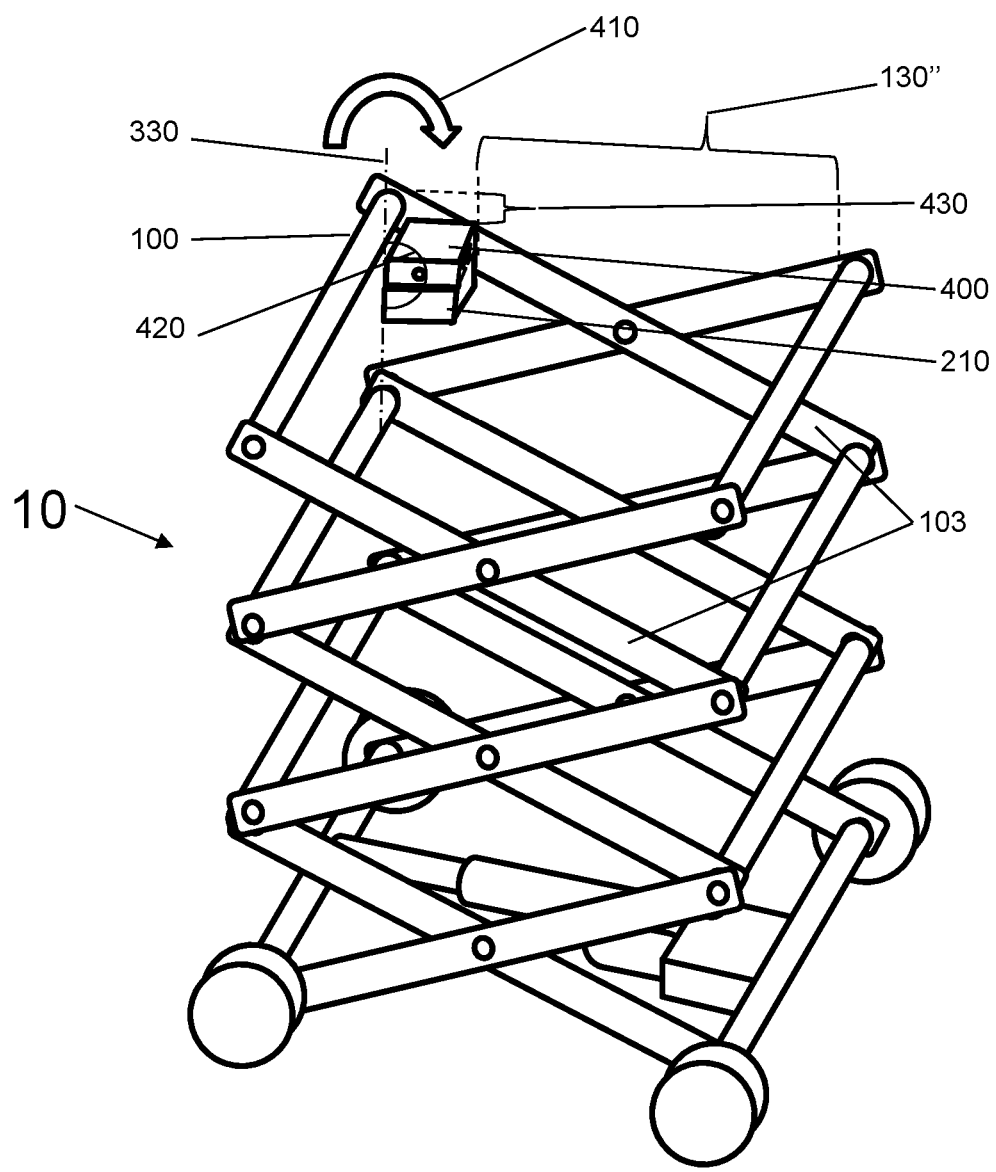
FIG. 4A-B shows, in simplified form, a litter lift, with an internal battery connector and removable battery, mounted to one of the inner crossbars.
Figure 4B:
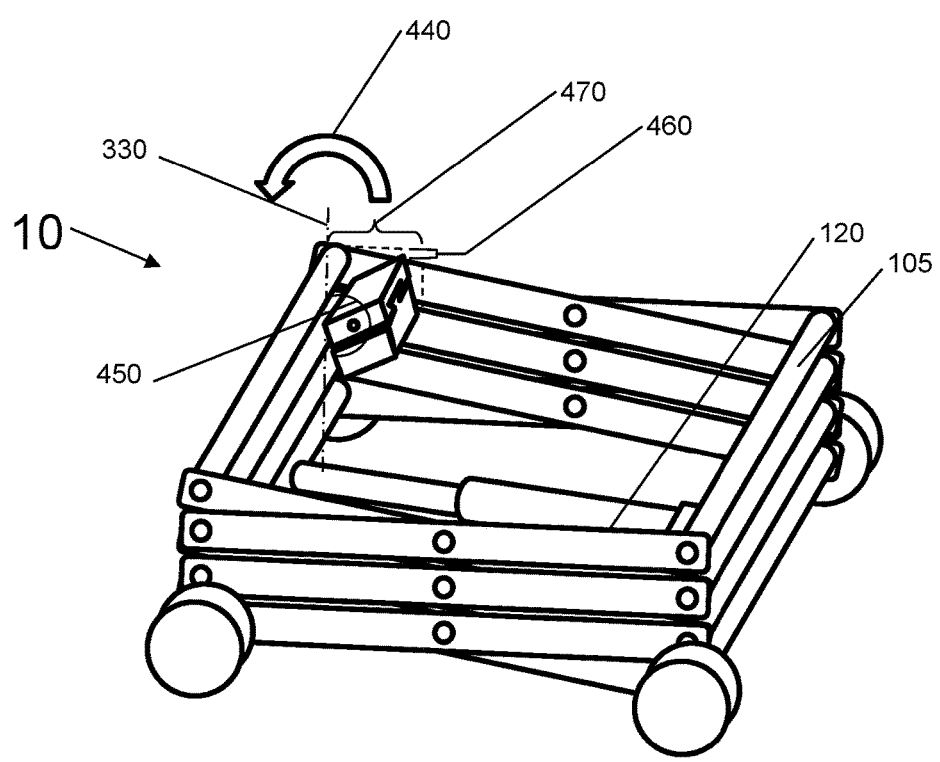

The other configuration for an internally mounted battery connector/battery that we want to discuss is where the battery connector/battery combination is mounted internally to one of the inner crossing members as can be seen in FIG. 4A-B.

FIG. 4A-B shows, in simplified form, a litter lift 10, with an internal battery connector 400 and removable battery 210, mounted to one of the inner cross members 103. The battery connector in this case is connected to the "far", as depicted in the drawing inner crossbars 103 (but could just as easily have been connected to the "near" inner cross members 103).

Just like in the previous example, when the litter lift 10 expands the battery connector 400, assuming it is fixedly attached to one of the inner cross members 103, effectively rotates in a direction 410. [Note: an option where the battery connector 400 is pivotably connected to one of the inner cross members 103 and along with the battery is weight balanced so that its rotation can be similarly planned for is also anticipated.]

With respect to FIG. 4A-B we will similarly discuss a technique to insure smooth operation, where the battery 210 (and the connector 400) never exceeds being parallel to the theoretical line 330. Specifically, the battery connector 400 (with the battery 210) is mounted to the upper cross members 100 and configured such that the maximum angle 420 is typically 180 degrees or less, with respect to the theoretical line 330. The maximum angle 420 produces an offset distance 430 between the top of the battery connector 400 (or battery 210 if it protrudes above the connector), which needs to always greater than zero; otherwise, the litter pan 15 (not shown in FIG. 4A-B) will slide on the battery connector 400, rather than the upper crossbar 100.

Just like before, the need for an offset distance 430 is typically not an issue when the litter lift 10 is fully extend; however, when the litter lift is fully collapsed the battery connector 400 effectively rotates in an outward direction 440 and produces a minimum angle 450 related to a theoretical line 330 and a collapsed offset distance 460. What is import is that the collapsed offset distance 460 be is also always greater than or equal to zero. Otherwise, the litter pan 15 (not shown) will sit on the battery connector 300, rather than the upper crossbar 100 when the litter lift is fully compressed.

Additionally, in a similar fashion the relationships previously discuss need to be adjusted to accommodate the effective change in the width/diameter of the upper cross (used in the equations). The width/diameter of the upper cross has grown and is now the combined width/diameter of the crossbar 132 and the maximum distance protruded 470 by either the battery connector 400 or the battery 210 towards to the upper crossbar 105 on the opposite side; and, consequently, the closest upper crossbar distance 130" (used in the equations) has shrunk and is now the minimum distance between whichever of the battery connector 400 or the battery 210 to the upper crossbar 105 on the opposite side.

Additionally, it is understood that when the litter lift 10 is in the fully collapsed position that there needs to be clearance between the battery 210 (or the battery connector 400 if it protrudes lower than the battery) and the linear actuator 120 (and/or the floor).

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed:
1. A litter lift comprising:
  two sets of interconnected outer and inner crossing members connected to one another by at least four crossbars configured as a scissor lift, wherein at least two of the cross bars are upper crossbars and at least two are lower crossbars;
  associated with each of the at least two lower crossbars is a set of wheels and at least one linear actuator, wherein the at least one linear actuator is configured to pull the at least two lower crossbars towards one another, by rolling on the set of wheels, such that the at least two lower crossbars remain parallel and the scissor lift elevates; and a litter pan configured to removably nest, without the need for disassembly, on the at least two upper crossbars, wherein the litter pan has a base configured to seat on the at least two upper crossbars, a litter area, and two ends extending downward from the base and configured to be parallel to the at least two upper crossbars;

wherein the litter area has a depth and is configured to hold cat litter and has two regions: an upper portion that is configured to be above the base and a lower portion that is configured to be below the base, such that the lower portion will always be within the scissor lift when the litter pan is nested;

wherein the lower portion has a lower portion length in a direction of the two ends;

wherein one of the two ends is a sliding end and another of the two ends is a constraining end and the litter pan has a sliding distance and a constraining distance, wherein the sliding distance is between the sliding end and the lower portion and the constraining distance is between the constraining end and the lower portion;

wherein one of the at least two upper crossbars is a sliding crossbar having a sliding bar width and another of the at least two upper crossbars is a constraining crossbar having a constraining bar width;

wherein the litter lift has a closest upper crossbar distance between the at least two upper crossbars when the litter lift is fully elevated and a furthest upper crossbar distance, which is a combined length including a distance between the at least two upper crossbars when the litter lift is fully compressed, the sliding bar width, and the constraining bar width;

wherein the lower portion length is less than or equal to the closest upper crossbar distance;

wherein a combined length of the sliding distance, the lower portion length, and the constraining distance is greater than or equal to the furthest upper crossbar distance;

wherein the constraining distance is greater than or equal to the constraining bar width;

wherein the sliding distance is greater than or equal to the furthest upper crossbar distance minus both the lower portion length and the constraining distance; and wherein the two ends are configured to constrain movement of the litter pan such that it will not slide off of the at least two upper crossbars once seated on them, and the base is configured to slide on the sliding crossbar along the sliding distance.

2. The litter lift of claim 1 wherein the at least one linear actuator is configured to generate a pull force of 300 pounds or more.

3. The litter lift of claim 1 wherein at least one of the set of wheels are swivel casters.

4. The litter lift of claim 1 wherein the depth of the litter area is between 4 to 6 inches deep.

5. The litter lift of claim 1 further comprising a battery connector attached to one of the upper outer crossing members, and wherein the battery connector is configured to allow a battery to be removed and inserted by a user.

6. The litter lift of claim 5 further comprising a low battery level indicator.

7. The litter lift of claim 1 further comprising a battery connector attached to one of the upper crossbars.

8. The litter lift of claim 7 wherein the battery connector is fixedly secured to the attached one of the upper crossbars, which is fixedly secured to one of the crossing members.

9. The litter lift of claim 8 wherein the battery connector is fixedly secured internal to the litter lift and configured so that when a battery is installed into the battery connector, neither the battery connector nor the battery interfere with the crossbars nor the ability of the litter pan to be seated on the crossbars, during normal operation.

10. The litter lift of claim 9 is configured:
wherein the battery connector is connected to the sliding crossbar and the sliding bar width comprises a width of the sliding crossbar and a battery connector distance that the battery connector, inclusive of the battery if installed, protrudes towards the constraining crossbar.

11. The litter lift of claim 1 further comprising a battery connector attached internally to one of the inner crossing members and wherein the battery connector is configured to allow a battery to be removed and inserted by a user.

12. The litter lift of claim 11 further comprising a low battery level indicator.

13. The litter lift of claim 11 wherein the battery connector is configured so that when a battery is installed into the battery connector, neither the battery connector nor the battery interfere with the crossbars nor the ability of the litter pan to be seated on the crossbars, during normal operation.

14. The litter lift of claim 13 is further configured:
wherein the battery connector is near the sliding crossbar and the sliding bar width comprises a width of the sliding crossbar and a distance the battery connector, inclusive of the battery when installed, protrudes towards constraining crossbar.

* * * * *